(12) United States Patent
Yang

(10) Patent No.: US 10,712,146 B2
(45) Date of Patent: *Jul. 14, 2020

(54) DISTANCE MEASURING SYSTEM AND METHOD USING THEREOF

(71) Applicant: PIXART IMAGING INC., Hsin-Chu (TW)

(72) Inventor: Shu-Sian Yang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 64 days.

This patent is subject to a terminal disclaimer.

(21) Appl. No.: 16/150,657

(22) Filed: Oct. 3, 2018

(65) Prior Publication Data
US 2019/0033059 A1    Jan. 31, 2019

Related U.S. Application Data

(63) Continuation of application No. 14/940,113, filed on Nov. 12, 2015, now Pat. No. 10,126,118.

(30) Foreign Application Priority Data

Apr. 17, 2015    (TW) .............................. 104112385 A

(51) Int. Cl.
*G01B 11/02* (2006.01)
*G06T 7/55* (2017.01)

(52) U.S. Cl.
CPC ............ *G01B 11/026* (2013.01); *G01B 11/02* (2013.01); *G06T 7/55* (2017.01)

(58) Field of Classification Search
CPC .............................. G01B 11/026; G01B 11/02
USPC .......................................................... 356/4.03
See application file for complete search history.

(56) References Cited

U.S. PATENT DOCUMENTS

| | | | |
|---|---|---|---|
| 6,819,436 B2 * | 11/2004 | Ono ........................ | G01S 17/89 356/3.1 |
| 10,126,118 B2 * | 11/2018 | Yang ..................... | G01B 11/026 |
| 2003/0164875 A1 * | 9/2003 | Myers .................. | H04N 13/261 348/52 |
| 2010/0066854 A1 * | 3/2010 | Mather .................. | G02B 5/005 348/222.1 |

* cited by examiner

*Primary Examiner* — Mark Hellner
(74) *Attorney, Agent, or Firm* — Li & Cai Intellectual Property (USA) Office

(57) ABSTRACT

A distance measuring system includes a light emitting member, an optical member, an image sensing member, and a computing member. The light emitting member provides a light beam to an object. The optical member is disposed on a transmission path of the light beam reflected by the object. The image sensing member is disposed on a transmission path of the part of the light beam passing through the optical member, and the image sensing member has an image sensing area for receiving the part of the light beam passing through the optical member and receiving the part of the light beam not passing through the optical member. The computing member compares a difference between the deformation area and the non-deformation area of the object image so as to obtain a distance variation of the object.

5 Claims, 10 Drawing Sheets

DISTANCE MEASURING SYSTEM AND METHOD USING THEREOF

CROSS-REFERENCE TO RELATED APPLICATIONS

The present disclosure is a Continuation Application claiming the benefit of and priority to U.S. patent application Ser. No. 14/940,113, filed on Nov. 12, 2015, the entire contents of each of which being incorporated herein by reference.

BACKGROUND OF THE INVENTION

1. Field of the Invention

The instant disclosure relates to a distance measuring system and a method using thereof; in particular, to a distance measuring system and a method using thereof by capturing an object image to measure a distance of an object.

2. Description of Related Art

There is lots of ways for measuring distance, such as sound wave, infrared, and laser, which are generally applied to measure the round-trip time of sound wave or light wave that touches an object, and the traveling distance of the sound wave or the light wave can be calculated via known conditions of the sound wave or light wave. A plurality of the image sensing members disposed at different positions can be used to capture an object having images captured from different angles, and the correlation of the images are compared to set each relative position of the images, and the images are stacked. The premise that knowing the space and focal length between these image sensing members is used for further reading the position of the object.

However, in the abovementioned measuring methods, the distance of the object is measured by the sound wave or infrared wave that is liable to be interfered due to the sound wave or infrared wave emits the divergent beam, and the application is restricted. In addition, in the conventional distance measuring method which measures the distance of the object by positioning a plurality of the image sensing members at different positions, the results with deviation are easily obtained because the positioning positions between the image sensing members are complex, so as to cause the accuracy of the image to be affected and the measuring cost is higher.

SUMMARY OF THE INVENTION

The instant disclosure provides a distance measuring system and a method using thereof; in particular, to a distance measuring system and a method using thereof by capturing an image which has a deformation amount of a deformation area corresponding to the non-deformation area to measure distance of an object.

A distance measuring system of one embodiment of the instant disclosure includes a light emitting member, an optical member, an image sensing member, and a computing member. The light emitting member provides a light beam to an object. The optical member is disposed on a transmission path of the light beam reflected by the object, wherein a part of the light beam reflected by the object is adapted for passing through the optical member. The image sensing member is disposed on a transmission path of the part of the light beam passing through the optical member, and the image sensing member has an image sensing area for receiving the part of the light beam passing through the optical member and receiving the part of the light beam not passing through the optical member, wherein the light emitting member partly overlaps the image sensing area. The image sensing member is used for capturing an object image from the object, and the object image includes a deformation area generated from the part of the light beam passing through the optical member received by the image sensing area and a non-deformation area generated from the part of the light beam not passing through the optical member received by the image sensing area. The computing member compares a difference between the deformation area and the non-deformation area of the object image so as to obtain a distance variation of the object.

A distance measuring method of a first embodiment of the instant disclosure includes the following steps: a) capturing a first object image when an object being at a first position, and the first object image including a first deformation area and a first non-deformation area, and b) calculating a deformation amount of the first deformation area and the first non-deformation area to obtain a first distance between the first position and a distance measuring system.

In addition, another distance measuring method of another embodiment of the instant disclosure includes the following steps: a) capturing a second object image when the object being at a second position, and the second object image including a second deformation area and a second non-deformation area, b) calculating a deformation amount of the second deformation area and the second non-deformation area to obtain a second distance between the second position and the distance measuring system, and c) calculating a difference between the first distance and the second distance, so as to obtain a space between the first position and the second position.

The instant disclosure relates to a distance measuring system and a method using thereof; in particular, a distance variation of the object is measured by capturing a relative deformation amount of the image at different time.

A distance measuring system of one embodiment of the instant disclosure includes a light emitting member, an optical member, an image sensing member, and a computing member. The light emitting member provides a light beam to an object. The optical member is disposed on a transmission path of the light beam reflected by the object, wherein the light beam reflected by the object is adapted for passing through the optical member. The image sensing member is disposed on a transmission path of the part of the light beam passing through the optical member, and the image sensing member is disposed on a transmission path of the part of the light beam passing through the optical member, and the image sensing member has an image sensing area for receiving the part of the light beam passing through the optical member and receiving the part of the light beam not passing through the optical member, wherein the light emitting member partly overlaps the image sensing area. The image sensing member is used for capturing an object image from the object, and the object image includes a deformation area generated from the part of the light beam passing through the optical member received by the image sensing area and a non-deformation area generated from the part of the light beam not passing through the optical member received by the image sensing area. The computing member compares a difference between the deformation area and the non-deformation area of the object image so as to obtain a distance variation of the object.

A distance measuring system of another embodiment of the instant disclosure includes a light emitting member, an optical member, an image sensing member, and a computing member. The light emitting member provides a light beam to an object. The optical member is disposed on a transmission path of the light beam reflected by the object, wherein the light beam reflected by the object is adapted for passing through the optical member. The image sensing member is disposed on a transmission path of the light beam passing through the optical member, and the image sensing member has an image sensing area for receiving the part of the light beam passing through the optical member. The computing member compares a deformation difference of a first object and a second object generated from the light beam passing through the optical member received by the image sensing area at different time, so as to obtain a distance variation of the object.

A distance measuring method of a first embodiment of the instant disclosure includes the following steps: a) capturing a first object image when a object being at a first position, and the first object image including a first deformation area and a first non-deformation area, and b) calculating a deformation amount of the first deformation area and the first non-deformation area to obtain a first distance between the first position and a distance measuring system.

A distance measuring method of the second embodiment of the instant disclosure includes the following steps: a) when an object being at the first position, capturing a first object image, b) when the object being at the second position, capturing a second object image, c) calculating a deformation difference of the first object image and the second object image to obtain a space between the first position and the second position.

In summary, the first embodiment of the instant disclosure provides a distance measuring system which includes a light emitting member, an optical member, an image sensing member, and a computing member. The optical member partly overlaps the image sensing member which has an image sensing area, and the image sensing area of the image sensing member can receive the light beam passing through the optical member and receive the light beam not passing through the optical member. Therefore, the bright image and the dark image of the object captured by the image sensing member and the difference image processed by the image sensing member based on the bright image and the dark image both include the deformation area of the image sensing area which is partly overlapped corresponding to the optical member and the non-deformation area of the image sensing area which is not overlapped corresponding to the optical member.

The first embodiment of the instant disclosure provides a distance measuring method. Since the optical member partly overlaps the image sensing area, the bright image and the dark image of the object captured by the image sensing area includes the deformation area of the image sensing area which is partly overlapped corresponding to the optical member and the non-deformation area of the image sensing area which is not overlapped corresponding to the optical member. The computing member can calculate the deformation amount of the first deformation area corresponding to the first non-deformation area of the first difference image to obtain a first distance between the first position and a distance measuring system.

Additionally, another embodiment of the instant disclosure further provides another distance measuring method. Compared to the first embodiment, when the object is moved from the first position to the second position, the computing member can calculate a relative deformation amount between the deformation area and the non-deformation area of the object which is located at the second position having the difference image, so as to obtain a second distance between the second position and the distance measuring system. The computing member subtracts the second distance and the first distance to obtain a space between the first position and the second position.

The second embodiment of the instant disclosure provides a distance measuring system. The optical member completely covers the image sensing member having an image sensing area, and the image sensing area receives the light beam reflected by the object and passing through the optical member. Hence, the image of the object captured by the image sensing member at different times or at different positions both suffer deformation corresponding to the image sensing area completely overlapping with the optical member.

The second embodiment of the instant disclosure provides a distance measuring method. The computing member is used for comparing a deformation difference of a first object and a second object generated from the light beam passing through the optical member received by the image sensing area at different times or at different positions, so as to obtain a distance variation of the object.

Accordingly, the distance measuring method of the instant disclosure is not liable to be restricted like the measuring method of prior arts such as sound wave or infrared, and the image accuracy is also not affected due to the complicated positioning locations among a plurality of image sensing members like the prior arts. The distance measuring system obtains the space between the image sensing member and the object only via one image sensing member. The cost of measurement is not only lower than prior arts but also the application is not limited.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Figure 1A:
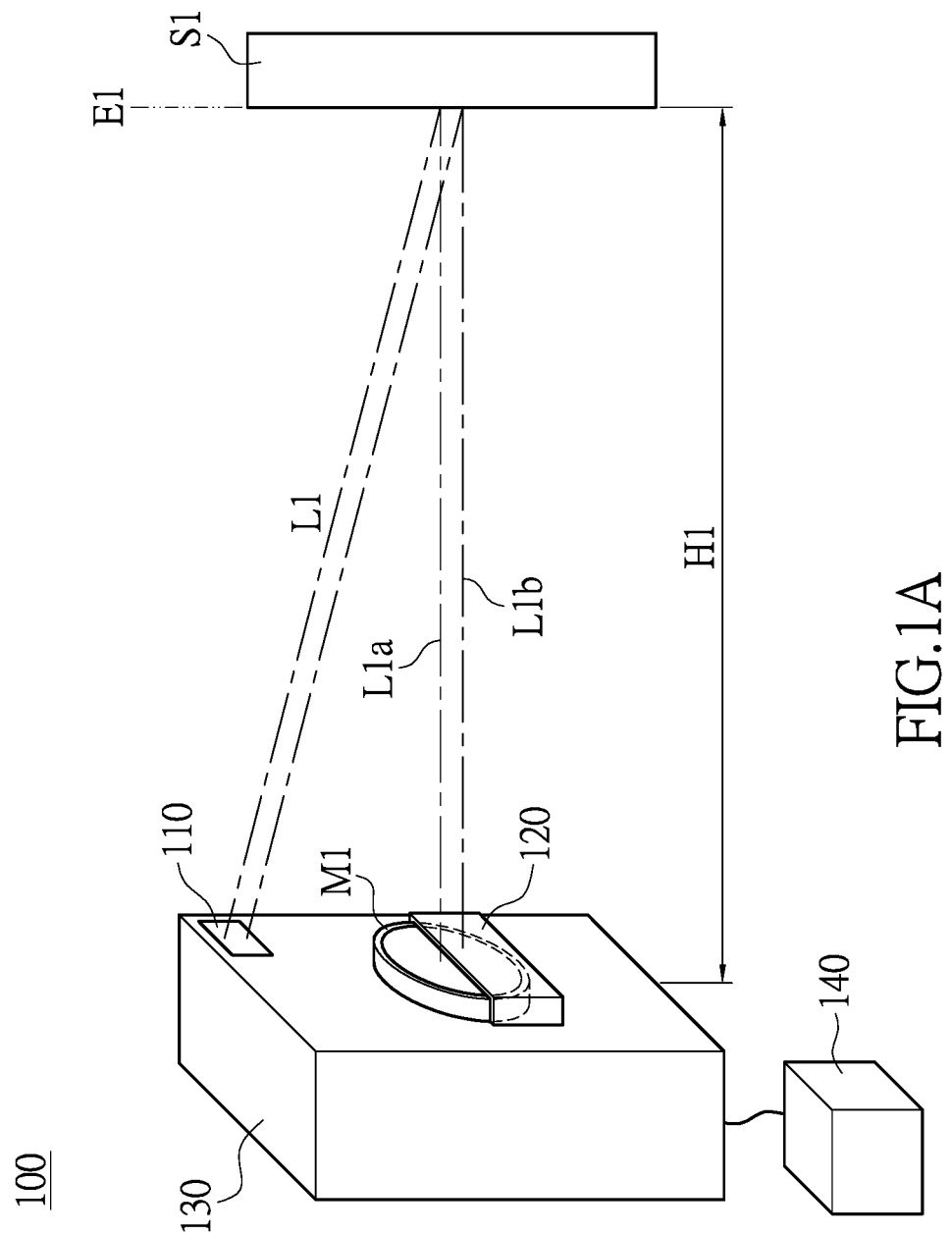
FIG. 1A shows an architecture view of a distance measuring system of a first embodiment of the instant disclosure.
Figure 1B:
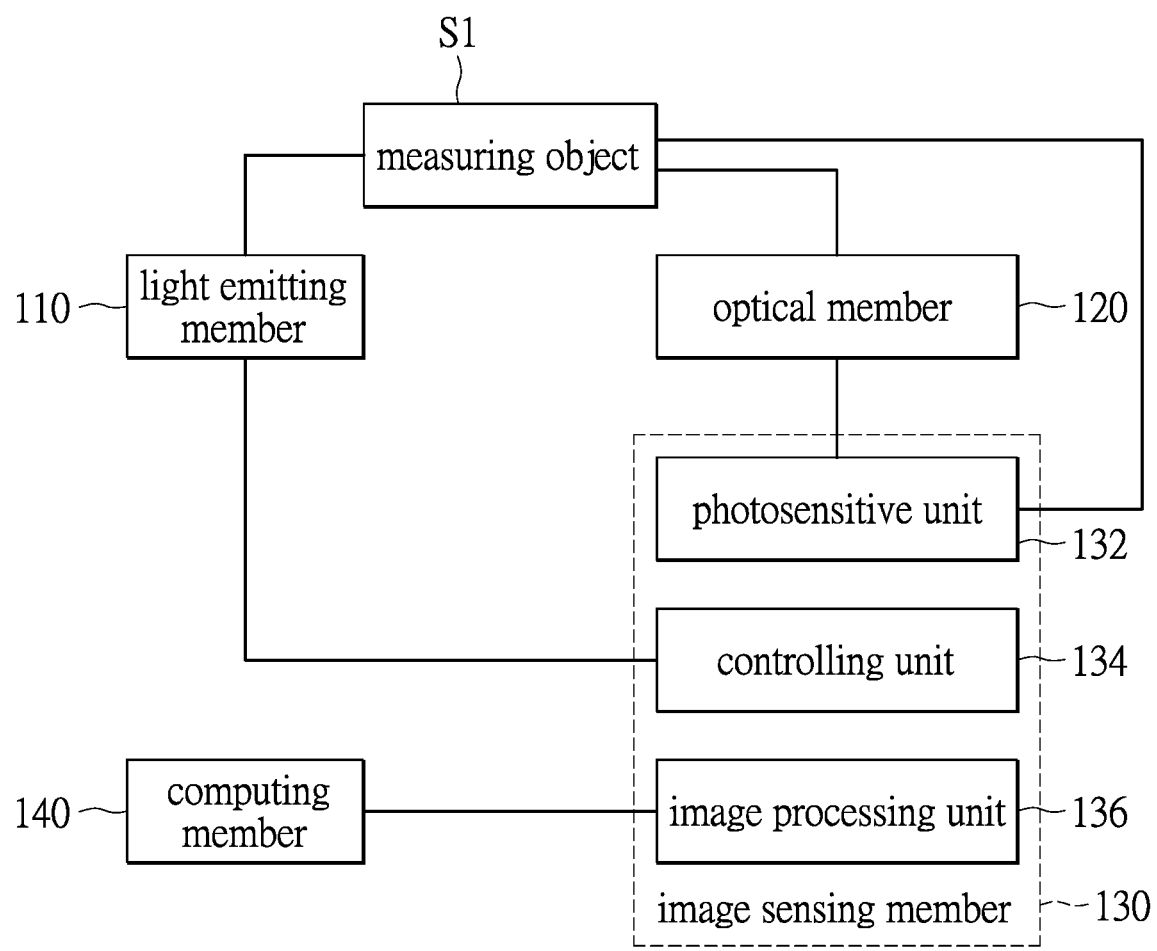
FIG. 1B shows a function block diagram of the distance measuring system of the first embodiment of the instant disclosure.

FIG. 1A shows an architecture view of a distance measuring system of a first embodiment of the instant disclosure, and FIG. 1B shows a function block diagram of the distance measuring system of the first embodiment of the instant disclosure. Referring to FIGS. 1A and 1B, a distance measuring system 100 includes a light emitting member 110, an optical member 120, an image sensing member 130, and a computing member 140. The light emitting member 110 provides a light beam L1 to an object S1. The optical member 120 is disposed on the image sensing member 130 and partly overlaps the image sensing member 130, such that an object image captured by the image sensing member 130 has a deformation area overlapped with the optical member 120 and a non-deformation area not overlapped with the optical member 120. The computing member 140 obtains the deformation amount of the deformation area and the non-deformation area via analyzing the object image having a grayscale captured by the image sensing member 130, so as to obtain a distance variation of the object S1.

The light emitting member 110 can provide the light beam L1 to the object S1, wherein the object S1 is adapted for reflecting a part of the light beam L1$a$, L1$b$. Furthermore, the light emitting member 110 is adapted to alternately provide the light beam L1 and not provide the light beam L1 to illuminate the object S1, so that the image sensing member 130 can respectively capture a bright image (with light illuminating) and dark image (without light illuminating), and an exterior feature of the object S1 can be obtained by computing and analyzing. In practice, examples of the light emitting member 110 include, but are not limited to Light Emitting Diode (LED), High Intensity Discharge Lamp, or Halogen Lamp. It should be noted that, the light emitting member 110 is integrated in the image sensing member 130 in FIG. 1. In another embodiment, the light emitting member 110 can be disposed outside of the image sensing member 130 alone, FIG. 1A is only provided for explanation, and it should not be restricted herein.

The optical member 120 is disposed on a transmission path of the light beam L1$a$, L1$b$ reflected by the object S1, and the light beam L1$b$ reflected by the object S1 is adapted for passing through the optical member 120. The object S1 can generate an image through the optical member 120, the image may be changed depending upon characteristics of the optical member 120 and the distance of the distance measuring system 100 (first distance H1). For example, zoom-in and zoom-out, tilt, twist, spin, or dislocation. In practice, examples of species of the optical member 120 include, but are not limited to a lens, prism, and plane mirror. Examples of materials of the optical member 120 include, but are not limited to glass, and plastic which the light beam L1$b$ can be passed through. The image sensing member 130 has an image sensing area M1, and includes a photosensitive unit 132, a controlling unit 134, and an image processing unit 136. The photosensitive unit 132 is located in the image sensing area M1 and is used for sensing the light beam L1$a$, L1$b$ to capture the object S1, and the captured image can show the object S1 and a background located in a range of the image which is generated therein. The controlling unit 134 is used for controlling the light emitting member 110 to provide the light beam L1. That is, the controlling unit 134 controls the light emitting member 110 to provide the light beam L1 for illuminating the object S1 and not to provide the light beam L1 for illuminating the object S1. The image processing unit 136 is used for processing the image of the bright image and dark image of each captured object S1, so as to obtain the exterior feature of the object S1. In the embodiment, the controlling unit 134, the image processing unit 136, and the photosensitive unit 132 may form a single chip by integrating the algorithm in a circuit, or by controlling and calculating via other independent hardware components, and the instant disclosure is intended to cover the abovementioned scope.

Specifically, the image sensing member 130 is disposed on a transmission path of the light beam L1$a$ not passing through the optical member 120 and of the light beam L1$b$ passing through the optical member 120, the light emitting member 120 partly overlaps the image sensing area M1, and the image sensing area M1 can receive the light beam L1$b$ reflected by the object S1 and passing through the optical member 120, and can receive the light beam L1$a$ not passing through the optical member 120. Thus, the image captured by the image sensing member 130 includes two areas, one of the areas is defined as an image deformation area generated by the image sensing member 130 that the light beam L1$b$ passes through the optical member 120, the another area is defined as an image non-deformation area generated by the image sensing member 130 that the light beam L1$a$ does not pass through the optical member 120.

In the embodiment, the abovementioned computing member 140 may be a digital signal processor (DSP) or a central processing unit (CPU), wherein the computing member 140 can calculate the deformation amount between the deformation area and the non-deformation area depending on the object image captured by the image sensing member 130, so as to obtain a distance variation of the object S1.

In practice, the image sensing member 130 may be an image sensing device having a camera lens which may be set on an electronic device such as camera, smart phone, or computer. The photosensitive unit 132 may be a complementary metal-oxide-semiconductor sensor (CMOS sensor) or charge-coupled device (CCD). The optical member 120 may be set on the camera lens and partly cover the camera lens to partly overlap the image sensing area M1.

Figure 1C:
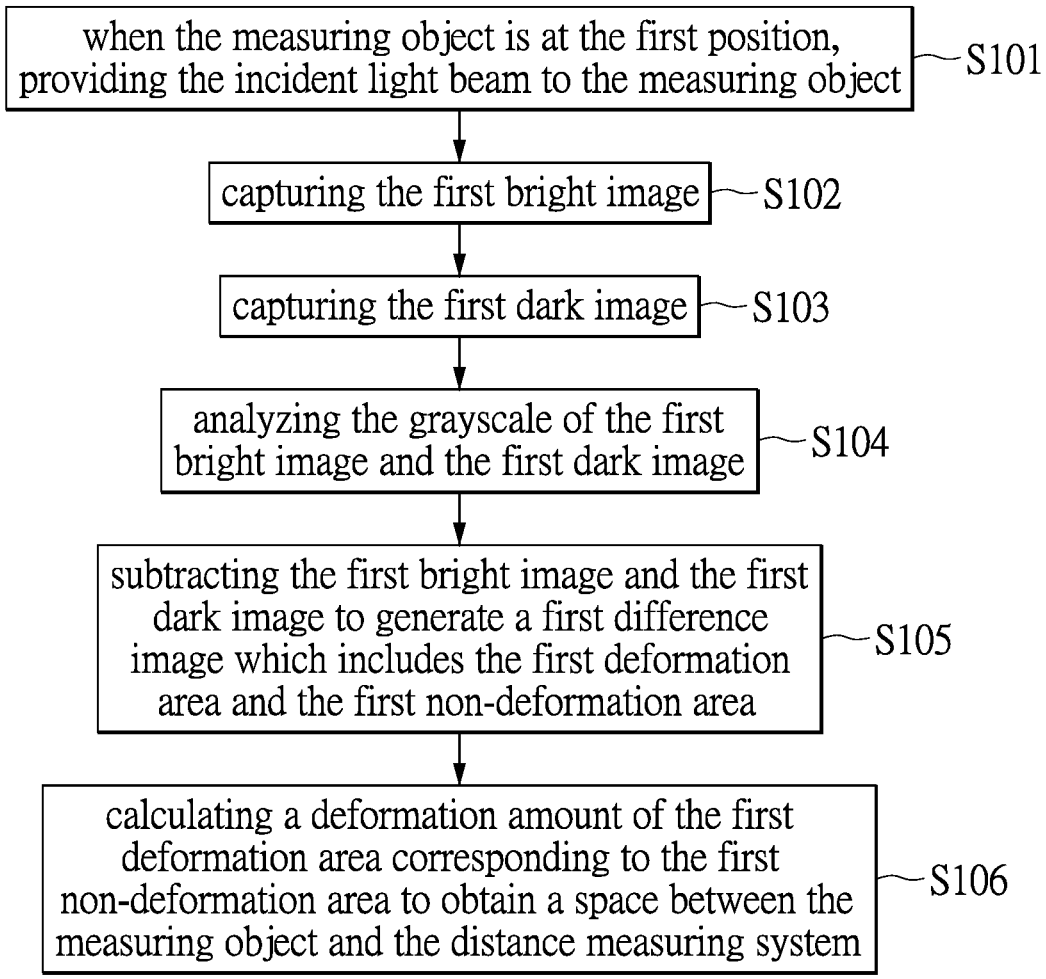
FIG. 1C shows a flow chart of a distance measuring method of the first embodiment of the instant disclosure.
Figure 1D:
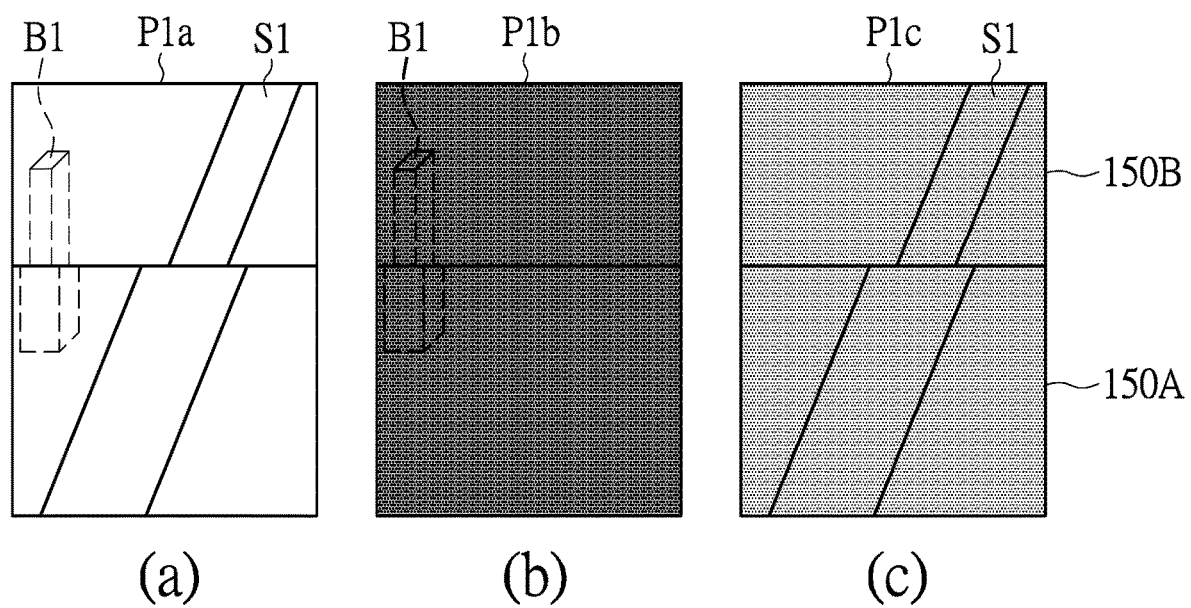
FIG. 1D is a schematic view of an object image captured by an image sensing member of the first embodiment of the instant disclosure.

FIG. 1C shows a flow chart of a distance measuring method of the first embodiment of the instant disclosure. FIG. 1D is a schematic view of an object image captured by an image sensing member of the first embodiment of the instant disclosure. Via the distance measuring method of the first embodiment of the instant disclosure, the first distance H1 between the object S1 and the distance measuring system 100 can be measured, that is a space between the first position E1 and the distance measuring system 100. Please refer to FIGS. 1A to 1D.

Conducting step S101, when the object S1 is at the first position E1, the space between the object S1 and the distance measuring system 100 is the first distance H1, the controlling unit 134 controls the light emitting member 110 providing the light beam L1 to the object S1, and the object S1 reflects a part of the light beam L1$a$, L1$b$.

Then, conducting step S102, when the controlling unit 134 controls the light emitting member 110 providing the light beam L1 to the object S1, the image sensing member 130 captures a first bright image P1$a$. As shown in FIG. 1D (a), the first bright image P1$a$ shows the image of the object S1 and a background B1 located in an image generating range, and the first bright image P1a includes the deformation area and the non-deformation area, wherein the deformation area corresponds to the image sensing area M1 partly overlapped with the optical member 120 and the non-deformation area corresponds to the image sensing area M1 not overlapped with the optical member 120. The first bright image P1a may be a grayscale image for analysis and recognition. In a case of 8 bits 256 colors (grayscale), the grayscale is quantized into 256 colors from pure black to pure white, the gray color is between the pure black color to pure white color, and the grayscale has a range from 0 to 255. Worthy of note is that, the image of the object S1 and the background B1 displayed in the non-deformation area are normally generated via not passing through the optical member 120, and the distance between the displayed object S1 having a shape and size of the image and the distance measuring system 100 is proportional to the first distance H1. The image displayed in the deformation area is a deformed image generated via the optical member 120, and the deformation feature depends on the species and materials of the optical member 120. For example, in the embodiment, the image in the deformation area performs amplifying deformation relative to the image in the non-deformation area.

Then, conducting step S103, when the controlling unit 134 controls the light emitting member 110 not providing the light beam L1 to the object S1, the image sensing member 130 captures a first dark image P1b. As shown in FIG. 1D (b), when the light beam L1 is not provided to illuminate the object S1, the first dark image P1b does not show the image of the object S1. If the background B1 is a self-luminous object, the first dark image P1b can display the background B1, wherein the first dark image P1b also includes the deformation area and the non-deformation area. Similarly, the first dark image P1b also may be the gray scale image.

Step S104 is then conducted to analyze the grayscale of the first bright image P1a and the first dark image P1b. In detail, the computing member 140 analyzes the grayscale distribution of the first bright image P1a and the first dark image P1b respectively, such that distributed positions, shapes, and ranges depending upon different pixels of the grayscale in the first bright image P1a and the first dark image P1b are obtained.

Step S105 is then conducted to subtract the first bright image P1a and the first dark image P1b. Specifically, the grayscale of relative position having the pixels of the first bright image P1a and the first dark image P1b is subtracted, so as to obtain a first difference image P1c of the first bright image P1a and the first dark image P1b, and the first difference image P1c having a difference grayscale is in a range of −255 to 255. As shown in FIG. 1D (c), the background B1 of the first bright image P1a and the first dark image P1b can be filtered by subtracting the images, and the first difference image P1c is obtained and displays the image of the object S1. Similarly, a first deformation area 150A and a first non-deformation area 150B of the first difference image P1c both correspond to the deformation area and non-deformation area of the first bright image P1a and the first dark image P1b. Accordingly, the first deformation area 150A corresponds to the image sensing area M1 partly overlapped with the optical member 120, and the first non-deformation area 150B corresponds to the image sensing area M1 not overlapped with the optical member 120.

Conducting step S106, the deformation amount of the first deformation area 150A corresponding to the first non-deformation area 150B is calculated to obtain the distance variation of the object S1. In detail, the image of the object S1 of the first deformation area 150A may have many deformation forms (e.g., zoom-in and zoom-out, tilt, twist, spin, or dislocation) relatively to the first non-deformation area 150B, and the deformation form is changed depending upon the factors, such as the characteristics of the optical member 120 and the first distance H1. As shown in FIG. 1D (c), the deformation form of the zoom-in and zoom-out is applied in the embodiment, but is not limited thereto. The distance measuring system 100 further includes a built-in digital data which stores various deformation forms (e.g., zoom-in and zoom-out, tilt, twist, spin, or dislocation) and stores the data generated by the various deformation forms corresponding to the first distance H1. By comparing the built-in digital data, the computing member 140 can obtain the first distance H1 between the object S1 and the distance measuring system 100 based on the change of deformation forms.

According to above, by the distance measuring method of the embodiment in the instant disclosure, since the optical member 120 only partly overlaps the image sensing area M1, the bright image and the dark image of the object S1 captured by the image sensing member 130 includes the deformation area of the image sensing area M1 which is partly overlapped corresponding to the optical member 120 and the non-deformation area of the image sensing area M1 which is not overlapped corresponding to the optical member 120. The computing member 140 can calculate the deformation amount of the first deformation area 150A corresponding to the first non-deformation area 150B of the first difference image P1c to obtain the first distance H1 between the object S1 and the distance measuring system 100. Hence, the distance measuring method of the instant disclosure is not liable to be restricted like the measuring method of prior arts such as sound wave or infrared, and the image accuracy is also not affected due to the complicated positioning locations among a plurality of image sensing members. Compared to conventional technology, the distance measuring system 100 obtains the space between the image sensing member 130 and the object S1 only via one image sensing member 130. The cost of measurement is not only lower than prior arts but also the application is not limited.

Figure 2A:
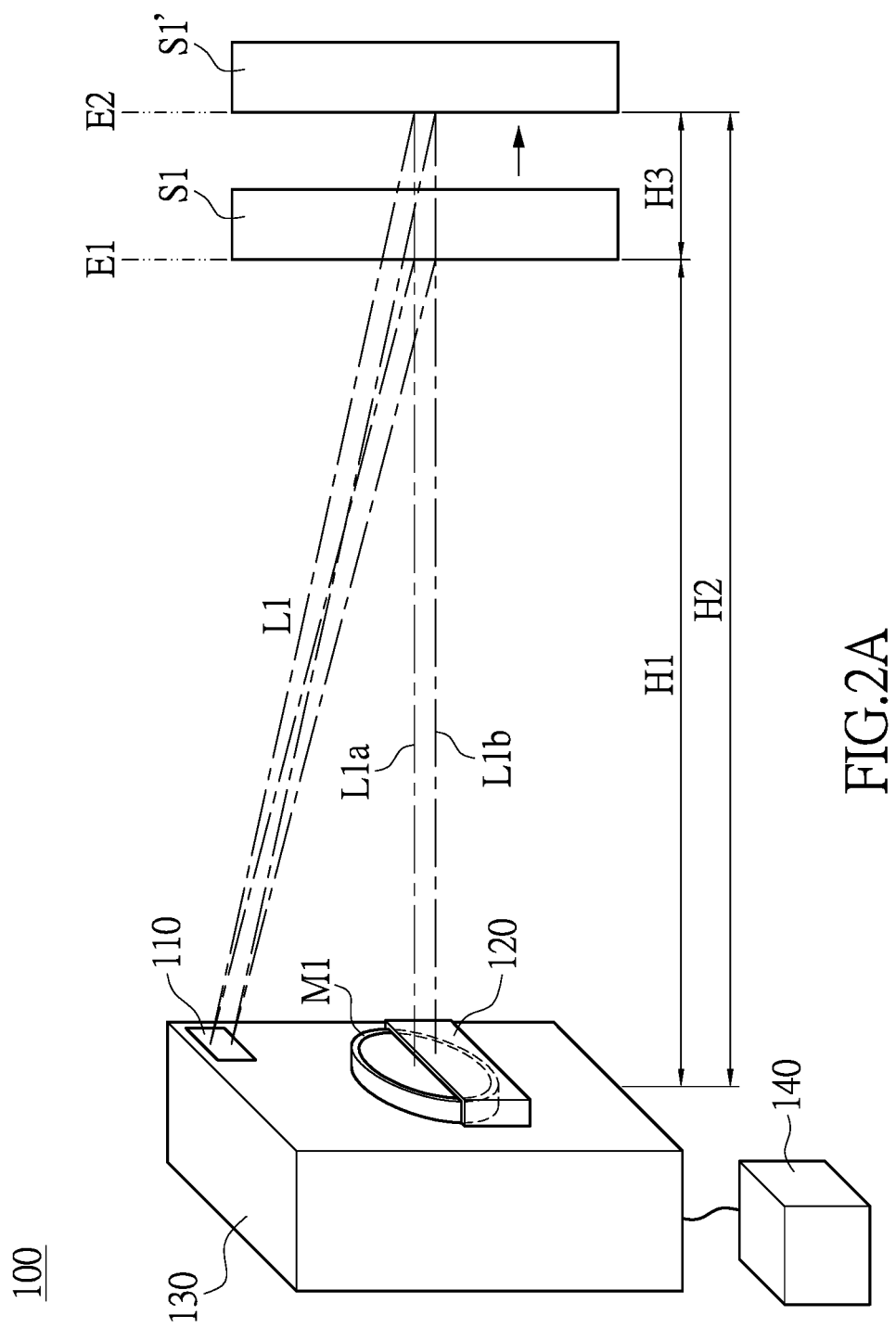
FIG. 2A shows an architecture view of a distance measuring system of another embodiment of the instant disclosure.
Figure 2B:
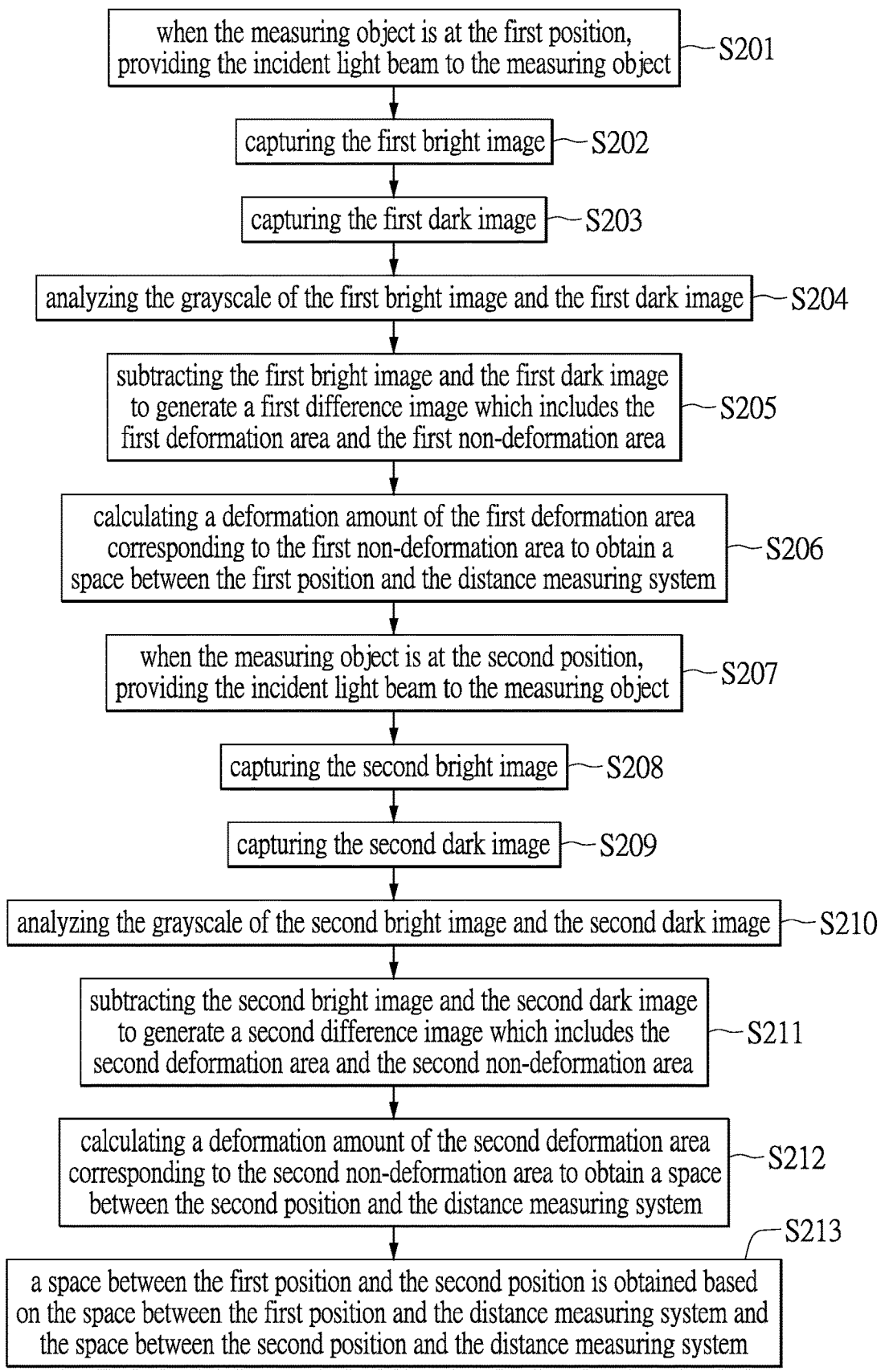
FIG. 2B shows a flow chart of a distance measuring method of another embodiment of the instant disclosure.
Figure 2C:
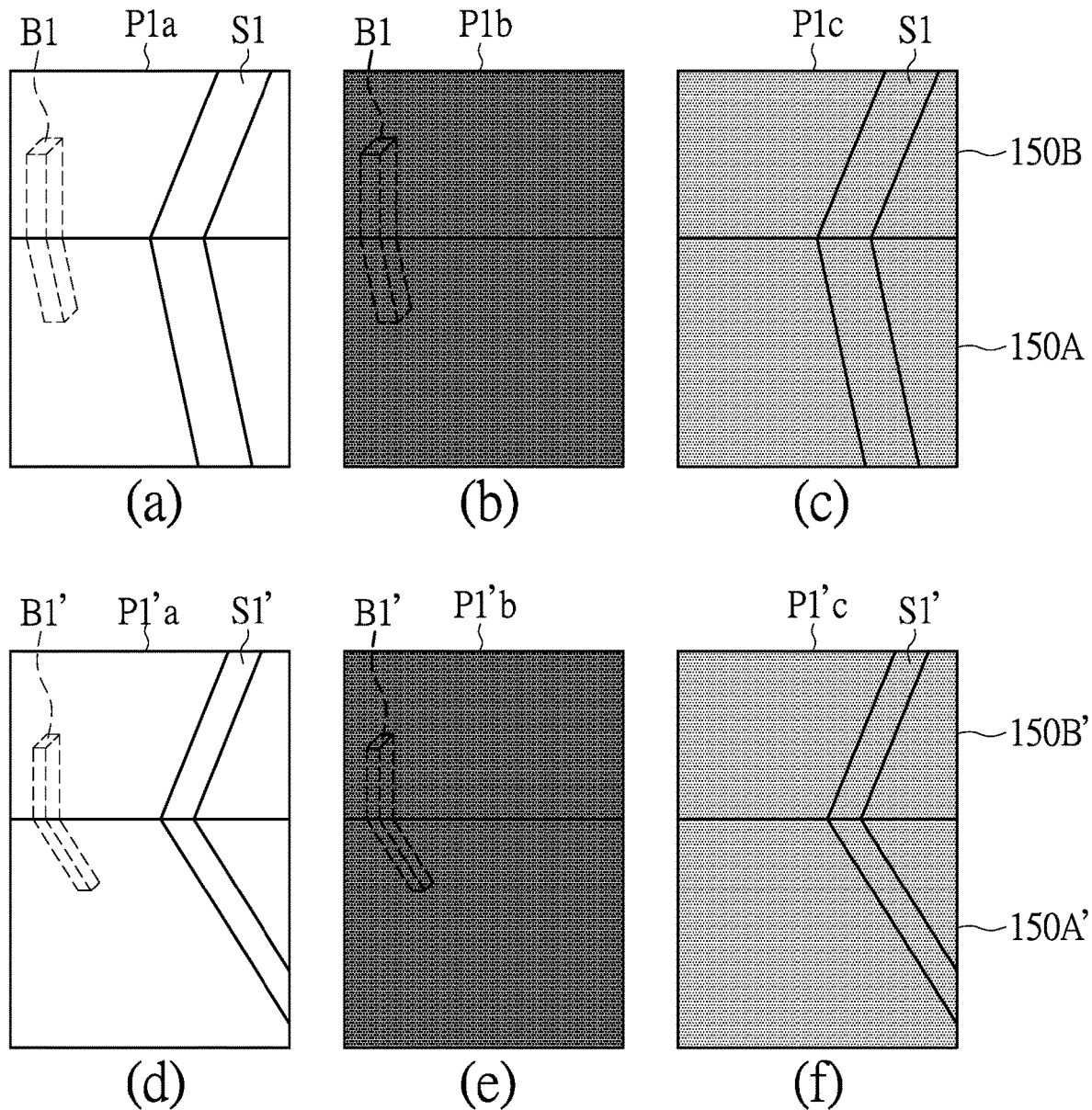
FIG. 2C is a schematic view of an object image captured by an image sensing member of another embodiment of the instant disclosure.

FIG. 2A shows an architecture view of a distance measuring system of another embodiment of the instant disclosure, FIG. 2B shows a flow chart of a distance measuring method of another embodiment of the instant disclosure, and FIG. 2C is a schematic view of an object image captured by an image sensing member of another embodiment of the instant disclosure. The object S1 is located at the space H3 between the first position E1 and the second position E2 can be measured by the distance measuring method of another embodiment of the instant disclosure. In the second embodiment, after the object S1 of the first embodiment is at the first position E1 and the first distance H1 is measured, and after the object S1 is moved to the second position E2, the distance can be further measured. The steps for measuring the first distance H1 are identical to that is in the first embodiment, and are not repeated herein. Please refer to FIGS. 2A to 2B, and 1B.

Firstly, when the object S1 is at the first position E1, steps S201 to S206 are conducted to obtain the first distance H1 between the object S1 of the first position E1 and the distance measuring system 100, wherein the implementation details of the steps S201 to S206 are both identical to the steps S101 to S106, thus it does not bear repeating herein.

Furthermore, in the embodiment, the image of the deformation area corresponding to the image of the non-deformation area is in the deformation form with twirling. But the deformation form represented in the deformation area is not limited in the instant disclosure.

Step S207 is then conducted, when the object S1' is moved from the first position E1 to the second position E2, the space between the object S1' and the distance measuring system 100 is a second distance H2, and the controlling unit 134 controls the light emitting member 110 providing the light beam L1 to the object S1', and the object S1' reflects a part of the light beam L1a.

Step S208 is then conducted, when the controlling unit 134 controls the light emitting member 110 providing the light beam L1 to the object S1', the image sensing member 130 captures a second bright image P1'a. As shown in FIG. 2C (d), the second bright image P1'a shows the images of the object S1' and a background B1' located in an image generating range. By the optical member 120 partly overlapping the image sensing area M1, the captured second bright image P'a includes the deformation area of the image sensing area M1 partly overlapped corresponding to the optical member 120 and the non-deformation area of the image sensing area M1 not overlapped corresponding to the optical member 120. The second bright image P1'a is a grayscale image.

It is worth to say that the images of the object S1' and the background B1' displayed in the non-deformation area are generated without passing through the optical member 120, the distance between the displayed object S1' having a shape and size of the image and the distance measuring system 100 is proportional to the second distance H2. The images of the object S1' and the background B1' displayed in the deformation area are generated passing through the optical member 120, and the characteristics of the deformation depends on the species and materials of the optical member 120. Similarly, the image of the deformation area corresponding to the image of the non-deformation area is in the deformation form with twirling.

Step S209 is then conducted, when the controlling unit 134 controls the light emitting member 110 providing the light beam L1 to the object S1', the image sensing member 130 captures a second dark image P1'b. As shown in FIG. 2C (e), if the background B1' is a self-luminous object, the second dark image P1'b can display the background B1', wherein the second dark image P1'b also includes the deformation area and the non-deformation area. It is worth mentioning that, the second dark image P1'b also may be the gray scale image.

Step S210 is then conducted, the grayscale of the second bright image P1'a and the second dark image P1'b is analyzed. Specifically, the computing member 140 analyzes the grayscale distribution of the second bright image P1'a and the second dark image P1'b respectively, such that the distributed positions, shapes, and ranges depend upon different pixels of the grayscale in the second bright image P1'a and the second dark image P1'b.

Step S211 is then conducted, the second bright image P1'a and the second dark image P1'b is subtracted to subtract the grayscale of relative position having the pixels of the second bright image P1'a and the second dark image P1'b, so as to obtain a second difference image P1'c of the second bright image P1'a and the second dark image P1'b. As shown in FIG. 2C (f), in a similar way, the second deformation area 150A' and the second non-deformation area 150B' of the second difference image P1'c both correspond to the deformation area and non-deformation area of the second bright image P1'a and the second dark image P1'b, wherein the second deformation area 150A' corresponds to the image sensing area M1 partly overlapped with the optical member 120, and the second non-deformation area 150B' corresponds to the image sensing area M1 not overlapped with the optical member 120.

Step S212 is then conducted, the deformation amount of the second deformation area 150A' corresponding to the second non-deformation area 150B' is calculated to obtain the distance variation between the object S1' being at the second position E2 and the distance measuring system 100. The deformation form with twirl is implemented in the embodiment. By comparing the built-in digital data, the computing member 140 can obtain the second distance H2 between the object S1' and the distance measuring system 100 based on the change of deformation forms such as twirl deformation.

However, in other embodiment, according to the factors such as the characteristics of the optical member 120 and the second distance H2, the image of the second deformation area 150A' represents various deformation forms (e.g., zoom-in and zoom-out, tilt, twist, spin, or dislocation) corresponding to the second non-deformation area 150B'.

Conducting step S213, the computing member 140 calculates and obtains the space H3 between the first position E1 and the second position E2 according to the first distance H1 between the first position E1 and the distance measuring system 100 and the second distance H2 between the second position E2 and the distance measuring system 100.

Based on the above description, via the distance measuring method of another embodiment of the instant disclosure, when the object S1 is at the first position E1, the bright image and the dark image of the captured object S1 includes the deformation area and the non-deformation area by the optical member 120 to measure the first distance H1 between the object S1 at the first position E1 and the distance measuring system 100. In the same way, when the object S1 is moved from the first position E1 to the second position E2, the bright image and the dark image of the captured object S1 includes the deformation area and the non-deformation area by the optical member 120, and the second distance H2 between the object S1' at the second position E2 and the distance measuring system 100 is measured. The computing member 140 subtracts the second distance H2 and the first distance H1 to obtain the space H3 between the first position E1 and the second position E2.

The abovementioned steps are applied in the distance measuring method of the embodiments of the instant disclosure. It should be emphasized that, the order of the steps may be considered as different measurement conditions to be adjusted under the spirit of the invention. For example, the distance measuring method of the instant disclosure may capture the dark image first and then capture the bright image, or the first bright image P1a, the first dark image P1b, the second bright image P1'a, and the second dark image P1'b may all be color images depending upon the species of the image sensing member 130. In the instant disclosure, the adjustable order of the steps being considered as different measurement conditions is not restricted herein.

Figure 3A:
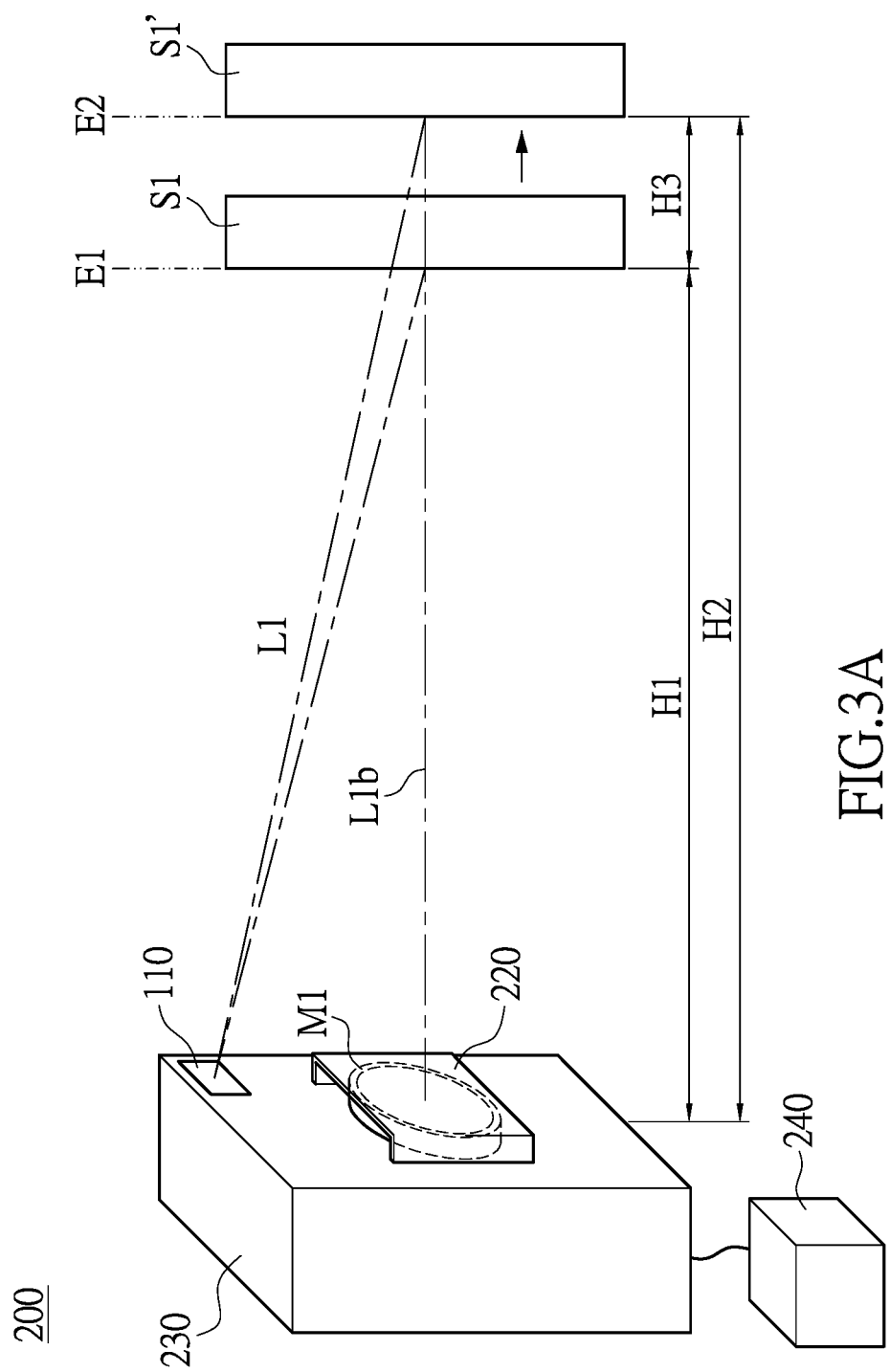
FIG. 3A shows an architecture view of a distance measuring system of a second embodiment of the instant disclosure.

FIG. 3A shows an architecture view of a distance measuring system of a second embodiment of the instant disclosure. The difference with the distance measuring system 200 of the second embodiment of the instant disclosure and the abovementioned distance measuring system 100 is that, the distance measuring system 200 having an optical member 220 completely covers the image sensing area M1. That is, the optical member 220 completely shelters the image sensing area M1. Hence, the object images captured by image sensing member 230 both are the deformation area of the image sensing area M1 overlapped with the optical member 220. In addition, operations of the image sensing member 230 and the computing member 240 are described in detail below, and the remaining components have been described as the first embodiment so that it does not bear repeating herein.

The image sensing member 230 is disposed on the transmission path of the light beam L1b passing through the optical member 220, the optical member 220 completely covers the image sensing area M1, and the image sensing area M1 can receive the light beam L1b reflected by the object S1 and passing through the optical member 220. Therefore, the images of the object S1 captured by the image sensing member 230 at different times or at different positions both suffer deformation corresponding to the image sensing area M1 being completely overlapped with the optical member 220.

The computing member 240 analyzes the grayscale of the object image captured by the image sensing member 230 at different times or at different positions, the deformation amount (deformation difference) of the deformation area of the image sensing area M1 completely overlapped with and corresponding to the optical member 220 is obtained, and the distance variation of the object S1 is then obtained.

Figure 3B:
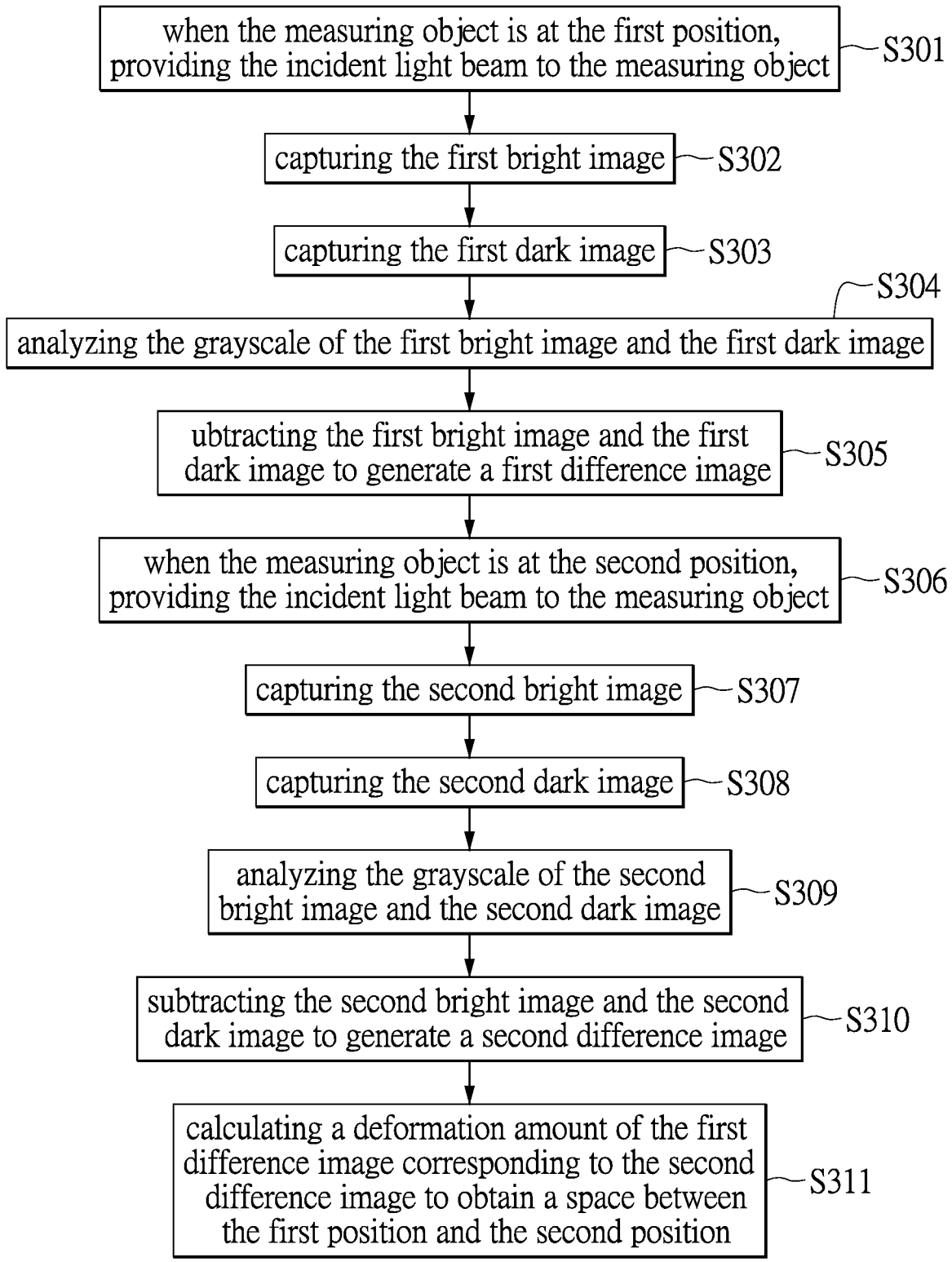
FIG. 3B shows a flow chart of a distance measuring method of the second embodiment of the instant disclosure.
Figure 3C:
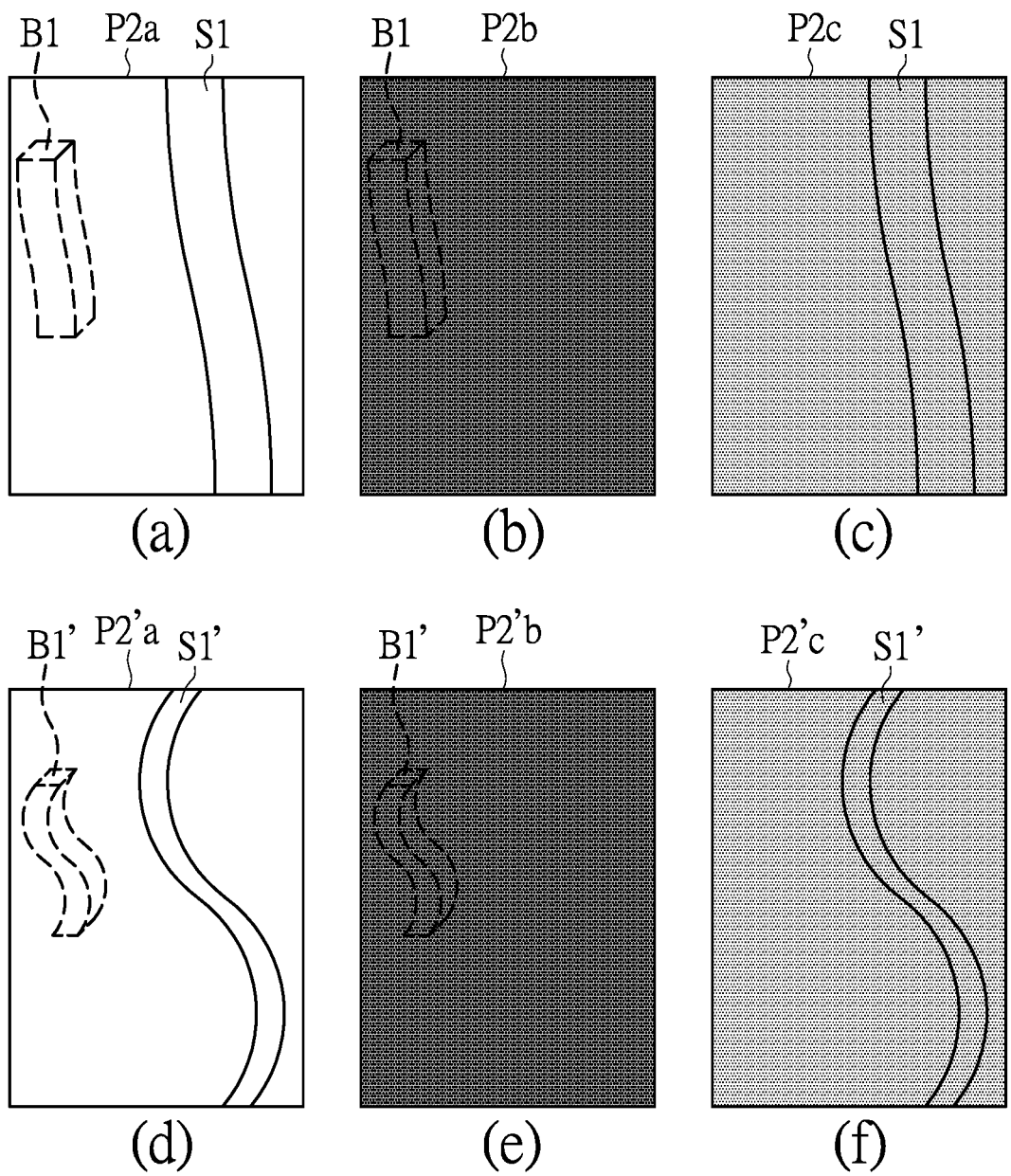
FIG. 3C is a schematic view of an object image captured by the image sensing member of the second embodiment of the instant disclosure.

FIG. 3B shows a flow chart of a distance measuring method of the second embodiment of the instant disclosure, and FIG. 3C is a schematic view of an object image captured by the image sensing member of the second embodiment of the instant disclosure. The difference with the distance measuring method of the second embodiment of the instant disclosure and the distance measuring method of the first embodiment of the instant disclosure is that, the distance measuring method of the second embodiment of the instant disclosure is to compare the deformation difference of the first object image and second object image generated by the light beam which passes through the optical member 220 and received by the image sensing area M1 at different times or at different positions, so as to obtain the distance variation of the object S1. The object image captured by the image sensing member 230 at different positions suffers deformation with different levels via the optical member 220 completely sheltering the image sensing area M1.

Conducting step S301, when the object S1 is at a first position E1, the space between the object S1 and the distance measuring system 200 is the first distance H1. The controlling unit 134 controls the light emitting member 110 providing the light beam L1 to the object S1 which reflects a part of the light beam L1b.

Step S302 is then conducted, when the light emitting member 110 provides the light beam L1 to the object S1, the image sensing member 130 captures a first bright image P2a. As shown in FIG. 3C (a), the first bright image P2a shows the image of the object S1 and the background B1 located in the image generating range, the first bright image P2a suffers the deformation corresponding to the optical member 220 completely overlapping the image sensing area M1, and the feature of the deformation depends upon the species and materials of the optical member 220, wherein the deformation form with twirl is implemented in the embodiment, as shown in FIG. 3C (a), but it is not limited herein.

Step S303 is then conducted, when the light emitting member 110 does not provide the light beam L1 to the object S1, the image sensing member 130 captures a first dark image P2b. As shown in FIG. 3C (b), the first dark image P2b shows the background B1 located in the image gener-
ating range, and the first dark image P2b suffers the deformation corresponding to the optical member 220 completely overlapping the image sensing area M1.

Step S304 is then conducted, and the computing member 240 analyzes the grayscale distribution of the first bright image P2a and the first dark image P2b respectively, such that the distributed positions, shapes, and ranges depending upon different pixels of the grayscale in the first bright image P2a and the first dark image P2b are obtained.

Step S305 is then conducted to subtract the first bright image P2a and the first dark image P2b, so as to obtain a first difference image P2c of the first bright image P2a and the first dark image P2b. As shown in FIG. 3C (c), the first difference image P2c can show the image of the object S1. Similarly, the first difference image P2c suffers the deformation corresponding to the optical member 220 completely overlapping the image sensing area M1.

Conducting step S306, when the object S1' is moved from the first position E1 to the second position E2, the space between the object S1' and the distance measuring system 200 is the second distance H2, the light emitting member 110 provides the light beam L1 to the object S1', and the object S1' reflects a part of the light beam L1b.

Step S307 is then conducted, when the light emitting member 110 provides the light beam L1 to the object S1', the image sensing member 230 captures a second bright image P2'a. As shown in FIG. 3C (d), the second bright image P2'a shows the image of the object S1' and the background B1' located in the image generating range, the second bright image P2'a suffers the deformation corresponding to the optical member 220 completely overlapping the image sensing area M1. It is worth to mention that, when the object S1' is moved from the first position E1 to the second position E2, the object image captured by the image sensing member 230 generates a different deformation amount (deformation difference) depending upon the different position. That is, the deformation amount of the second bright image P2'a is distinct from the deformation amount of the first bright image P2a. The deformation feature depends on the species and materials of the optical member 220.

Step S308 is then conducted, when the light emitting member 110 does not provide the light beam L1 to the object S1', the image sensing member 130 captures a second dark image P2'b. As shown in FIG. 3C (e), if the background Br is a self-luminous object, the second dark image P2'b can display the background B1', the second dark image P2'b suffers the deformation corresponding to the optical member 220 completely overlapping the image sensing area M1. Similarly, the deformation amount of the second dark image P2'b is distinct from the deformation amount of the first dark image P2b. Worthy of note is that, the second dark image P2'b also may be the gray scale image.

Step S309 is then conducted, and the computing member 240 analyzes the grayscale distribution of the second bright image P2'a and the second dark image P2'b respectively, such that the distributed positions, shapes, and ranges depending upon different pixels of the grayscale in the second bright image P2'a and the second dark image P2'b are obtained.

Step S310 is then conducted to subtract the second bright image P1'a and the second dark image P1 b, so as to obtain a second difference image P2'c of the second bright image P1'a and the second dark image P1'b. As shown in FIG. 3C (0, the second difference image P2'c suffers the deformation corresponding to the optical member 220 completely overlapping the image sensing area M1, wherein the deformation amount of the second difference image P2'c is distinct from the deformation amount of the first difference image P2c.

Step S311 is then conducted to calculate the deformation amount of the second difference image P2'c corresponding to the first difference image P2c to obtain the space H3 between the first position E1 and the second position E2. Specifically, the deformation form with twirl is implemented in the embodiment, when the object S1' is moved from the first position E1 to the second position E2, the image of the object S1' of the second difference image P2'c having a twirl deformation corresponding to the first difference image P2c generating different deformation amount. By comparing the built-in digital data, the computing member 240 can obtain the space H3 depending on the shape being changed by the deformation form of twirl.

According to the above, via the distance measuring method of the second embodiment of the instant disclosure, the images of the object S1 captured by the image sensing member 230 at different times or at different positions both suffer deformation corresponding to the optical member 220 completely overlapping the image sensing area M1. The computing member 240 can calculate the deformation amount of the second difference image P2'c corresponding to the first difference image P2c to obtain the movement distance of the object S1. Accordingly, the distance measuring method of the instant disclosure is not liable to be restricted like the measuring method of prior arts such as sound wave or infrared, and the image accuracy is also not affected due to the complicated positioning locations among a plurality of image sensing members as the prior arts. Compared to conventional technology, the distance measuring system 200 obtains the space between the image sensing member and the object only via one image sensing member 230. The cost of measurement is not only lower than prior arts but also the application is not limited.

In summary, the distance measuring system of the first embodiment of the instant disclosure includes a light emitting member, an optical member, an image sensing member, and a computing member. The optical member partly overlaps the image sensing member having an image sensing area. The image sensing area receives the light beam reflected by the object and passing through the optical member, and receives the light beam reflected by the object and not passing through the optical member. Therefore, the bright image and the dark image of the object captured by the image sensing member and the difference image processed by the image sensing member based on the bright image and the dark image both include the deformation area of the image sensing area which is partly overlapped corresponding to the optical member and the non-deformation area of the image sensing area which is not overlapped corresponding to the optical member.

The first embodiment of the instant disclosure provides a distance measuring method. Since the optical member partly overlaps the image sensing area, the bright image and the dark image of the object captured by the image sensing area includes the deformation area of the image sensing area which is partly overlapped corresponding to the optical member and the non-deformation area of the image sensing area which is not overlapped corresponding to the optical member. The computing member can calculate the deformation amount of the first deformation area corresponding to the first non-deformation area of the first difference image to obtain a first distance between the first position and a distance measuring system.

Additionally, another embodiment of the instant disclosure further provides another distance measuring method. Compared to the first embodiment, when the object is moved from the first position to the second position, the computing member can calculate the relative deformation amount between the deformation area and the non-deformation area of the object which is located the second position having the difference image, so as to obtain the second distance between the second position and the distance measuring system. The computing member subtracts the second distance and the first distance to obtain the space between the first position and the second position.

Besides, the second embodiment of the instant disclosure provides a distance measuring system. The optical member completely covers the image sensing member having an image sensing area, and the image sensing area receives the light beam reflected by the object and passing through the optical member. Hence, the image of the object captured by the image sensing member at different times or at different positions both suffer deformation corresponding to the image sensing area completely overlapping with the optical member.

The second embodiment of the instant disclosure provides a distance measuring method. The computing member is used for comparing a deformation difference of the first object and the second object generated from the light beam passing through the optical member received by the image sensing area at different times or at different positions, so as to obtain the movement distance of the object.

Accordingly, the distance measuring method of the instant disclosure is not liable to be restricted like the measuring method of prior arts such as sound wave or infrared, and the image accuracy is also not affected due to the complicated positioning locations among a plurality of image sensing members as the prior arts. The distance measuring system obtains the space between the image sensing member and the object only via one image sensing member. The cost of measurement is not only lower than prior arts but also the application is not limited.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A distance measuring system, comprising:
    an image sensing member having an image sensing area;
    an optical member partly overlaps the image sensing area, wherein the image sensing member is used for capturing an image, and the image includes a deformation area and a non-deformation area; and
    a computing member for comparing a difference between the deformation area and the non-deformation area of the image so as to obtain a distance data,
    wherein the image sensing member includes a controlling unit which controls the light emitting member providing a light beam to an object in the image sensing area, and
    wherein when the object is at a first position, the image sensing member captures a first bright image while the light beam is incident to the object, the image sensing member captures a dark image while the light beam is not incident to the object, and the image sensing member calculates a first difference image based on the first bright image and the first dark image.

2. The distance measuring system as claimed in claim 1, wherein when the object is at the first position, the first difference image includes a first deformation area of the image sensing area partly overlapping with the optical member and a first non-deformation area of the image sensing area not overlapping with the optical member.

3. The distance measuring system as claimed in claim 2, wherein when the object is at a second position, the image sensing member captures a second bright image and a second dark image, the image sensing member calculates a second difference image based on the second bright image and the second dark image, and the second difference image includes a second deformation area of the image sensing area partly overlapping with the optical member and a second non-deformation area of the image sensing area not overlapping with the optical member.

4. The distance measuring system as claimed in claim 3, wherein the computing member calculates a deformation amount of the first deformation area corresponding to the first non-deformation area and the second deformation area corresponding to the second non-deformation area, so as to obtain a distance variation of the first position and the second position, and the distance variation of the object is obtained.

5. The distance measuring system as claimed in claim 1, wherein the deformation area is generated from the part of the light beam passing through the optical member received by the image sensing area, and the non-deformation area is generated from the part of the light beam not passing through the optical member received by the image sensing area.

* * * * *